United States Patent [19]

Rodrian

[11] 4,129,855

[45] Dec. 12, 1978

[54] ANIMAL IDENTIFICATION SYSTEM

[76] Inventor: James A. Rodrian, N61 W15846 Edgemont Dr., Menomonee Falls, Wis. 53051

[21] Appl. No.: 815,796

[22] Filed: Jul. 15, 1977

[51] Int. Cl.² .................... H04Q 9/00; G08G 1/00; G01S 9/56
[52] U.S. Cl. .................... 340/152 T; 119/51 R; 340/38 L; 340/171 R; 235/92 CC
[58] Field of Search ............... 340/152 T, 171 R, 408, 340/38 L; 343/6.5 R, 6.5 SS, 6.8 R; 119/51 R; 235/92 CC

[56] References Cited

U.S. PATENT DOCUMENTS

| | | | |
|---|---|---|---|
| 3,270,338 | 8/1966 | Watters | 343/6.5 SS |
| 3,541,995 | 11/1970 | Fathauer | 340/152 T |
| 3,714,649 | 1/1973 | Brouwer et al. | 340/408 X |
| 3,964,024 | 6/1976 | Hutton et al. | 340/38 L |

Primary Examiner—Donald J. Yusko
Attorney, Agent, or Firm—Quarles & Brady

[57] ABSTRACT

A transceiver unit includes an oscillator which generates a pulse train to a transceiver counter that connects to a display. The pulse train is also coupled by means of coils to a counter contained in a portable transponder unit which attaches to the animal. The transponder unit counter counts in synchronism with the transceiver counter and it generates a reset pulse when it counts a preselected number of the pulses. This reset pulse is coupled by means of coils to the transceiver unit. The preselected number corresponds to the identification number of the animal and the reset pulse reads this number out of the transceiver counter to the display.

12 Claims, 8 Drawing Figures

ANIMAL IDENTIFICATION SYSTEM

BACKGROUND OF THE INVENTION

The field of the invention is automatic animal identification systems, and more particularly, systems for electronically identifying dairy cows and the like.

To optimize milk yield in dairy cows, automated computer systems are being utilized to collect data on each animal and to automatically dispense feed to it. The amounts of feed dispensed to a particular cow depend on its age, its health and its stage in the lactation cycle, and hence, it is necessary to identify each animal. Numerous devices are known for enabling the visual identification of dairy cows, including ear tags, neck bands and chains, tail bands and blank markers. However, such visual identification of animals requires the manual entry into the computer system of the proper identifying code which is both expensive and subject to error.

Automatic animal identification systems have been proposed. These include a passive transponder which is attached to, or implanted in, the animal. This transponder is triggered when the animal passes through an archway of energized coils. When thus triggered, the transponder transmits a unique code to a receiver which identifies the animal. On a dairy farm, for example, the archway is disposed in a passageway leading to the milking parlor so that the animal is identified just prior to feeding. The difficulty with such prior automated systems is their high cost, size and susceptibility to noise and other severe environmental conditions.

SUMMARY OF THE INVENTION

The present invention relates to an electronic means for identifying animals. More specifically, the invention includes a pulse generator for generating a series of pulses at an output terminal; first counter means coupled to the output of the pulse generator for counting the number of pulses, said first counter means having an output at which the total count is indicated when a signal is received at an enable terminal; second counter means for counting the number of pulses received at its input terminal, said second counter means being operable when a preselected count is reached to generate a reset signal at its output terminal; first coupling means including a count transmitter coil and a count receive coil for coupling the output of the pulse generator to the input terminal of the second counter means; and second coupling means including a reset pulse transmitter coil and a reset pulse receive coil for coupling the second counter means reset signal to the enable terminal on the first counter means.

The pulse generator, first counter means, count transmitter coil and reset pulse receive coil comprise a transceiver, and the second counter means, count receive coil and reset pulse transmitter coil comprise a transponder which is attached to the animal. When the animal approaches the transceiver, the pulses generated by the pulse generator are electromagnetically coupled by the first coupling means to the input of the second counter means in the transponder unit. The second counter means thus counts the pulses in synchronism with the first counter means which is directly connected to the pulse generator in the transceiver. When the preselected count is reached, the reset signal is generated by the second counter means through the second coupling means to the transceiver. The reset signal enables the count then stored in the first counter means to be displayed or stored and it resets the first counter means to zero to repeat the cycle. As long as the animal remains in the vicinity of the transceiver unit, both the first and second counter means are operated in synchronism to repeatedly count up to the preselected number and display that number or couple it to a data processor system. The second counter means includes means for manually selecting the preselected count, and thus, a unique count, or number, can be assigned to each transponder unit and hence to the animal which carries it.

A general object of the invention is to provide a small, low cost and reliable means for electronically identifying animals. The transponder is attached to or implanted in the animal and the second counter means therein is set to generate its reset pulse when a preselected count is reached. The electronics employed in the transponder is minimal and it is powered by a rectifier circuit which derives its energy from the signal generated by the transceiver. Because the counter in the transceiver and the counter in the transponder are continuously and repeatedly counted up to the preselected number, the identification of the animal is repeatedly made as long as the transponder is within range of the transceiver. As a result, errors introduced by noise pulses, for example, can be eliminated by averaging or comparison means which eliminate erroneous counts.

Another object of the invention is to provide an identification system which is compatible with commercially available data processor systems. The number which identifies the animal is embodied as a count stored as a binary number in the first counter. This binary number may be coupled through appropriate decoding circuits to a visual display, or it may be coupled through appropriate interface circuitry to a digital computer.

The foregoing and other objects and advantages of the invention will appear from the following description. In the description reference is made to the accompanying drawings which form a part hereof and in which there is shown by way of illustration a preferred embodiment of the invention. Such embodiment does not necessarily, however, represent the full scope of the invention, and reference is made to the claims herein for interpreting the breadth of the invention.

DESCRIPTION OF THE PREFERRED EMBODIMENT

Figure 1:
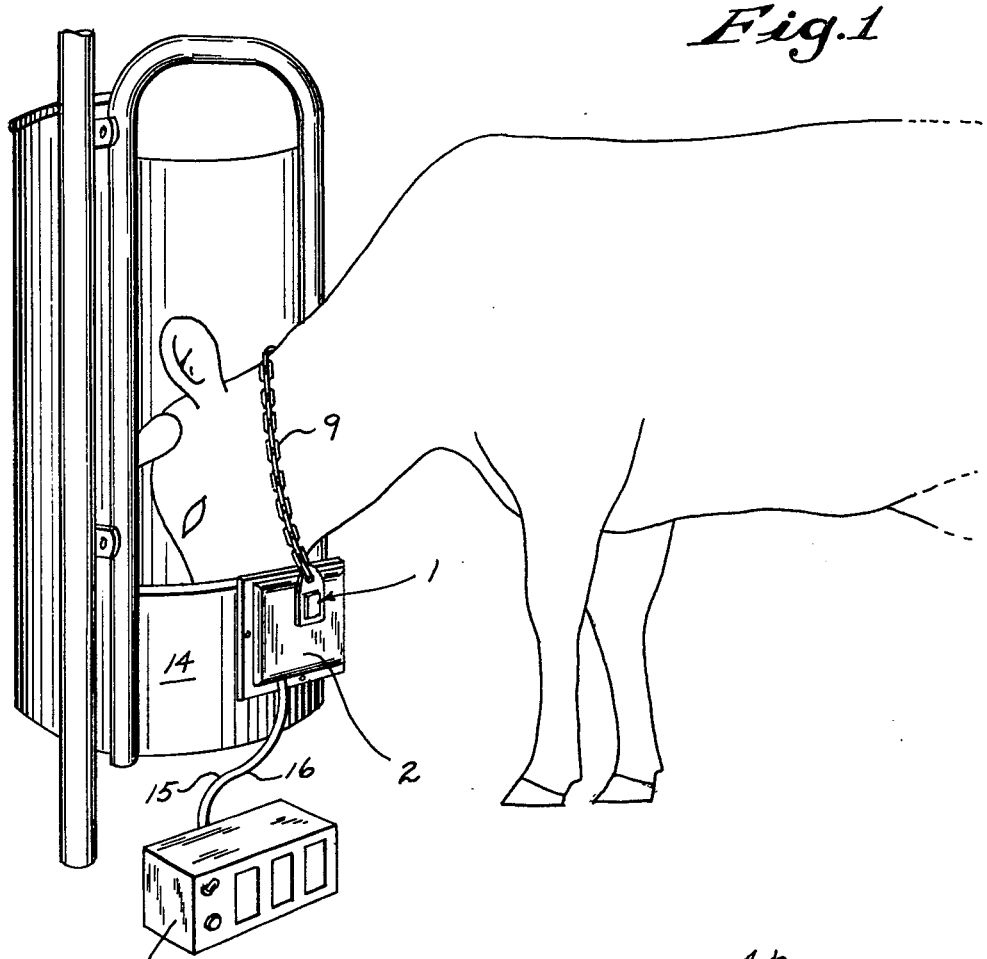
FIG. 1 is a pictorial view of the present invention applied to a cow.
Figure 2:
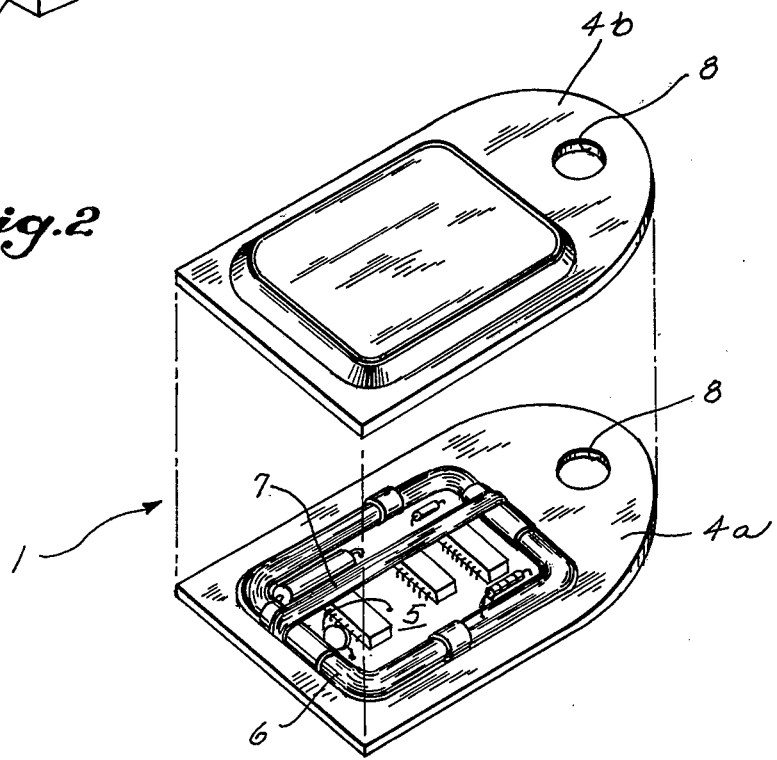
FIG. 2 is an exploded perspective view of the transponder unit which forms part of the present invention.

Referring to FIGS. 1-4 the animal identification system of the present invention includes a transponder unit 1 and a transceiver unit comprised of a coil module 2 and a console unit 3. As shown best in FIG. 2, the transponder unit 1 includes a two-part molded plastic housing 4a and 4b which encloses a printed circuit board 5. The printed circuit board 5 mounts the electrical components of the transponder unit 1 which will be described in more detail hereinafter. These components include a count receive coil 6 wound around the perimeter of the circuit board 5 and a reset pulse transmitter coil 7 wound around the circuit board 5 in a plane substantially perpendicular to the coil 6. The two halves of the housing 4 are bonded together to hermitically seal the electrical components of the transceiver 1 and an opening 8 is provided to receive a chain 9 that wraps around the neck of the animal.

Figure 3:
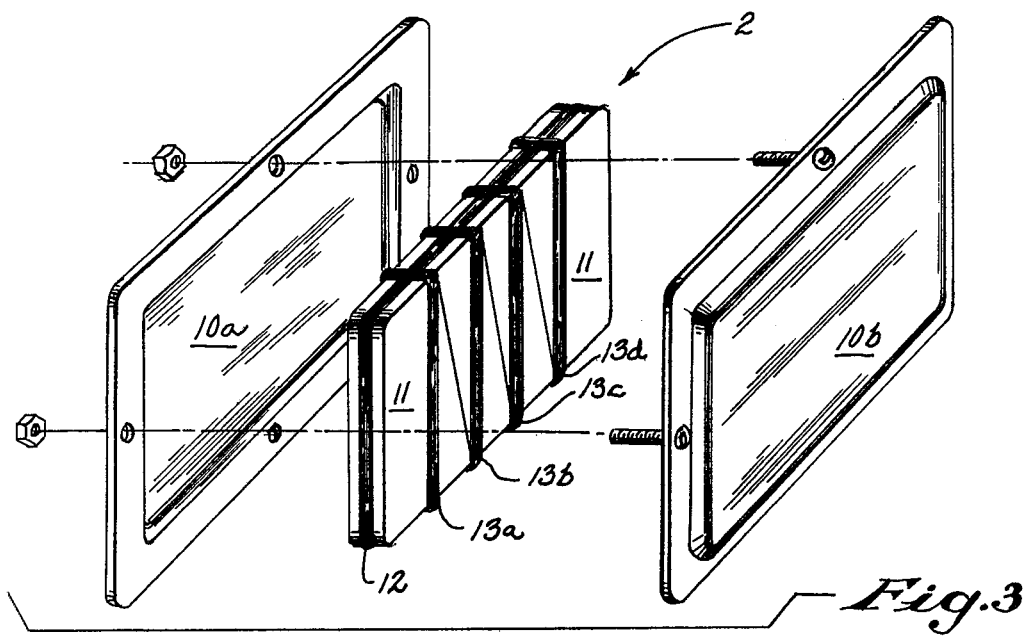
FIG. 3 is an exploded perspective view of a coil module which forms part of the transceiver unit of the present invention.
Figure 7:
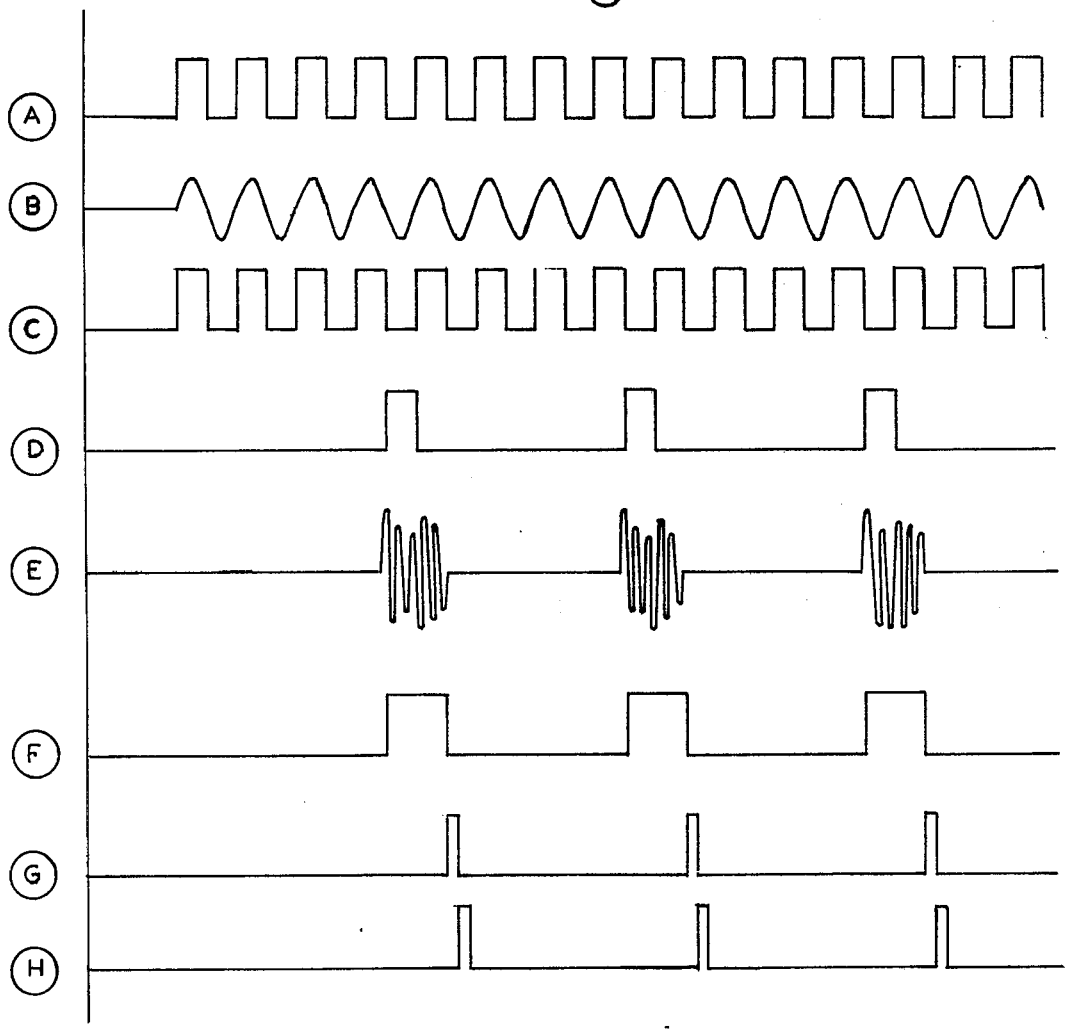
FIG. 7 is a graphic illustration of the signals which appear at various points of the circuit of FIG. 4.

As shown best in FIGS. 1 and 3, the coil module 2 includes a two-part molded plastic housing 10a and 10b which encloses a rectangular shaped coil support member 11. A count transmitter coil 12 is wound around the perimeter of the support member 11 and a reset pulse receive coil 13 is wound around the support member 11 in planes substantially perpendicular to that of the coil 12. The reset pulse receive coil 13 is comprised of four sections 13a-d which are spaced apart along the length of the support member 11 and are connected in series with one another. The two halves of the housing 10 are bonded together to hermitically seal the coils 12 and 13 and to provide a means for mounting them to a suitable structure. Excellent results have been achieved by mounting the coil module 2 to the front of a feed pan 14. When the animal inserts its snout in the feed pan 14, the transponder unit 1 comes in close proximity to the coil module 2 and a reliable coupling of the signals therebetween occurs.

Although the specifications for the transceiver coils 12 and 13 and the transponder coils 6 and 7 are not critical for the proper operation of the animal identification system, the size and structure of these coils in the preferred embodiment of the invention is provided in Table A.

TABLE A

| | |
|---|---|
| count transmitter coil 12 | 50 turns of #28 AWG wire, each turn defining an area of approximately 35 square inches. |
| reset pulse receive coil 13a-d | 12 turns of #28 AWG wire for each of the four sections, each turn defining an area of approximately 5 square inches. |
| count receive coil 6 | 750 turns of #36 AWG wire, each turn defining an area of approximately 3.3 square inches. |
| reset pulse transmitter coil 7 | 200 turns of #36 AWG wire, each turn defining an area of approximately .66 square inches. |

Figure 4:
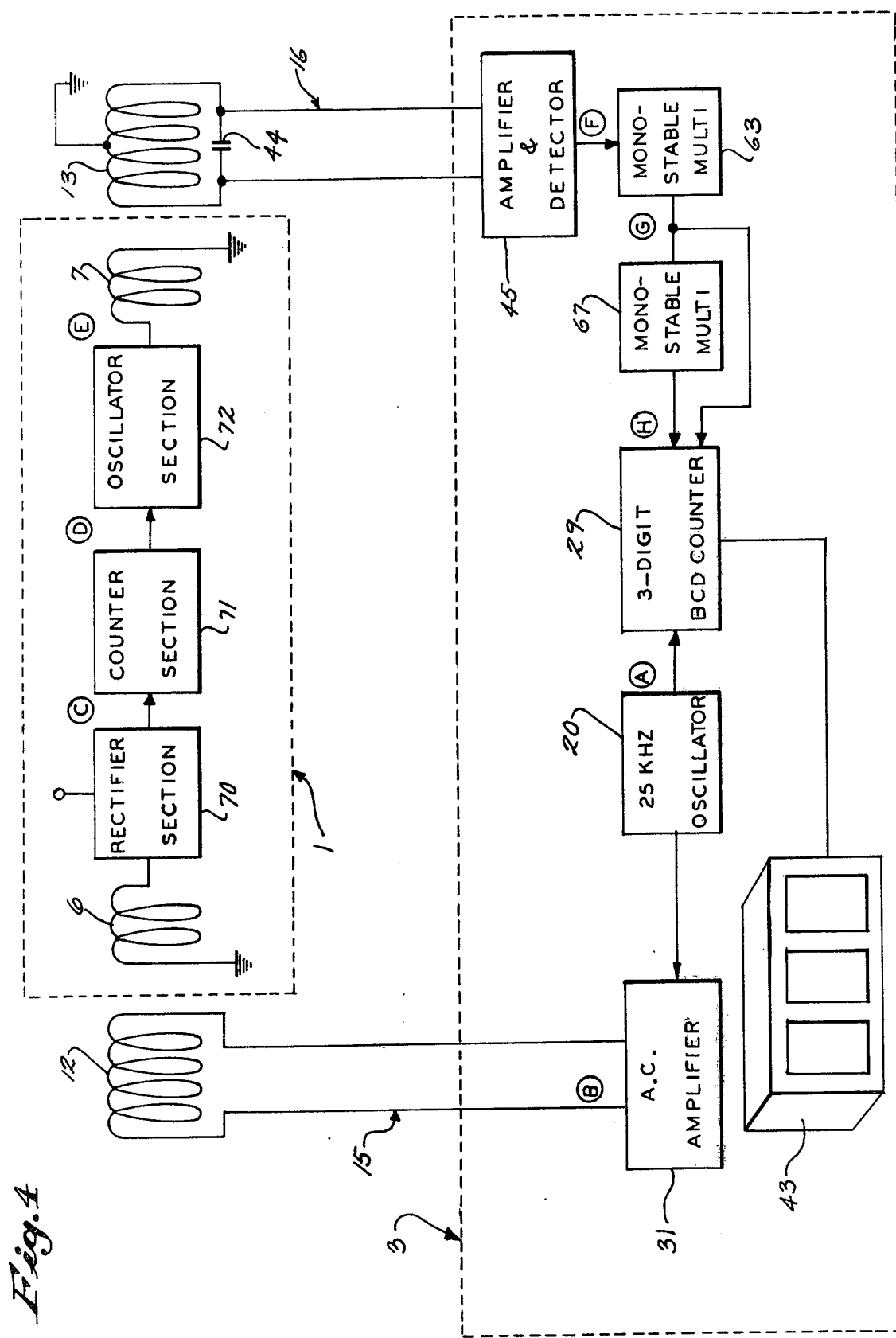
FIG. 4 is an electrical block diagram of the animal identification system of the present invention.

Referring particularly to FIGS. 1 and 4, the count transmitter coil 12 in the module 2 connects to the console unit 3 through a shielded cable 15 and the reset pulse receive coil 13 therein connects to the console 3 through a twisted pair 16. The console unit 3 may be situated in a convenient location which is up to 25 feet from the coil module 2. As will be discussed in more detail hereinafter, the console may be connected to a computer which receives identification codes from numerous such consoles throughout the farm, or it may form an integral part of such a computer.

Figure 6:
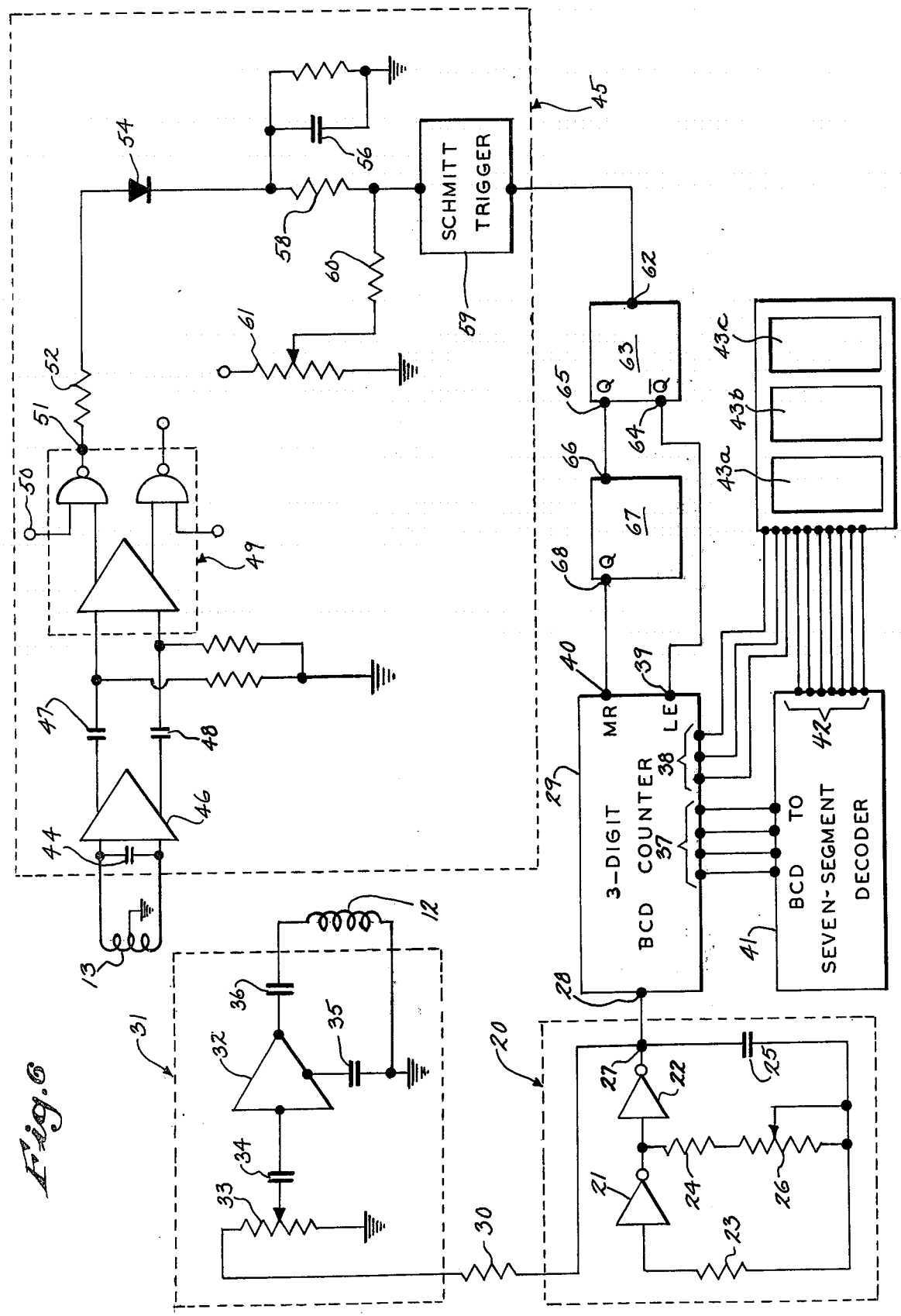
FIG. 6 is an electrical schematic diagram of the transceiver unit which forms part of the present invention.

Referring particularly to FIGS. 4 and 6, the transceiver unit contained within the console unit 3 includes a 25 kHz oscillator 20. The oscillator 20 includes a pair of inverter gates 21 and 22 which are interconnected by resistors 23 and 24 and a capacitor 25 in a conventional inverter oscillator configuration. A potentiometer 26 allows fine adjustment of the inverter oscillator frequency and the 25 kHz pulse train which is generated at the oscillator output terminal 27 is coupled directly to a clock terminal 28 on a three-digit BCD counter 29. The same 25 kHz pulse train is also coupled through a resistor 30 to the input of an a-c amplifier 31.

The a-c amplifier 31 includes an integrated circuit amplifier 32 which has a fixed gain of 50. An amplifier such as the LM380N disclosed in *Linear Data Book* published in 1976 by National Semiconductor Corporation is employed. The 25 KHz pulse train is applied to the input of this integrated circuit amplifier 32 through a level adjust potentiometer 33 and a coupling capacitor 34. A power supply decoupling terminal on the amplifier 32 connects to signal ground through a capacitor 35 and the output of the amplifier 32 drives and LC series circuit comprised of the count transmitter coil 12 and a capacitor 36. The value of the capacitor 36 is selected to tune the series resonant circuit to 25 kHz. A 25 kHz sinusoidal voltage of up to 150 volts peak to peak is thus generated across the count transmitter coil 12 to establish a substantial electromagnetic field thereabout.

The three-digit BCD counter 29 counts the pulses generated at the output terminal 27 of the oscillator 20. The counter 29 consists of three negative edge triggered BCD counters that are cascaded synchronously. A quad latch at the output of each counter permits storage of any given count. The count is then time division multiplexed, providing one BCD number or digit at a time at four output terminals 37. Digit select outputs 38 provide display control and are driven by an integral low frequency oscillator. The quad latches in the counter 29 are enabled when a logic high voltage is applied to a latch enable terminal 39 and the counter is reset to zero when a logic high voltage is applied to a master reset terminal 40. The counter 29 is a commercially available integrated circuit such as Model MC14553 described in Volume 5, Series A of the "Semi-Conductor Data Library" published in 1975 by Motorola Semi-Conductor Products, Inc.

The BCD number generated at the outputs 37 of the counter 29 is coupled to a BCD to 7-segment decoder circuit 41. An integrated circuit such as the Model MC14511 described in the above cited publication of Motorola Semi-Conductor Products, Inc. is employed to perform this function. The decoded output appears at seven output terminals 42 which connect to the inputs of three 7-segment light emitting diode displays 43a, 43b and 43c. The digit select outputs 38 on the BCD counter 29 connect to the respective 7-segment light emitting diode displays 43a-c to continuously and sequentially enable them to receive a digit from the decoder 41.

As will be explained in more detail hereinafter, when the transponder unit 1 is brought near the count transmitter coil 12, it receives the generated 25 kHz signal and converts it back to a 25 kHz pulse train. The pulses in this 25 kHz pulse train are counted and when a preselected number have been received by the transponder unit 1 it generates a 200 kHz signal for approximately 20 microseconds.

Referring particularly to FIGS. 4 and 6, the 200 kHz burst generated by the transponder 1 is received by the reset pulse receive coil 13 and coupled through the cable 16 to an amplifier and detector circuit 45. A capacitor 44 connects across the coil 13 and its value is selected to tune the resulting tank circuit to 200 kHz. The circuit 45 includes a differential input, differential output, wideband video amplifier 46 which has its inputs connected to the reset pulse receive coil 13. The outputs of the video amplifier 46 connect through coupling capacitors 47 and 48 to the inputs of a high speed analog voltage comparator 49. The video amplifier 46 is a linear integrated circuit such as the Model $\mu$A733 manufactured by Signetics and the voltage comparator 49 is a linear integrated circuit such as the Model SE-NE 529 also manufactured by Signetics. A strobe terminal 50 on the voltage comparator 49 is connected to a logic high voltage source and its "A" output terminal 51 is connected through a coupling resistor 52 and a diode 54 to a charging capacitor 56.

The circuit which includes the diode 54, resistor 52 and capacitor 56 operates as an envelope detector. The output of this envelope detector is a positive voltage pulse of approximately 20 microseconds which is coupled through a resistor 58 to the input of a Schmitt trigger 59. A resistor 60 and potentiometer 61 serve as a means for adjusting the trigger level of the Schmitt trigger 59. The Schmitt trigger 59 serves as a noise filter and as a means for shaping the 20 microsecond voltage pulse into a signal suitable for application to digital logic circuitry.

The amplifier and detector circuit 45 thus serves to amplify the 200 kHz reset signal received from the transponder unit 1 by the coil 13 and to convert that reset signal into a positive voltage pulse suitable for application to the input 62 of a first monostable multivibrator 63.

Figure 8:
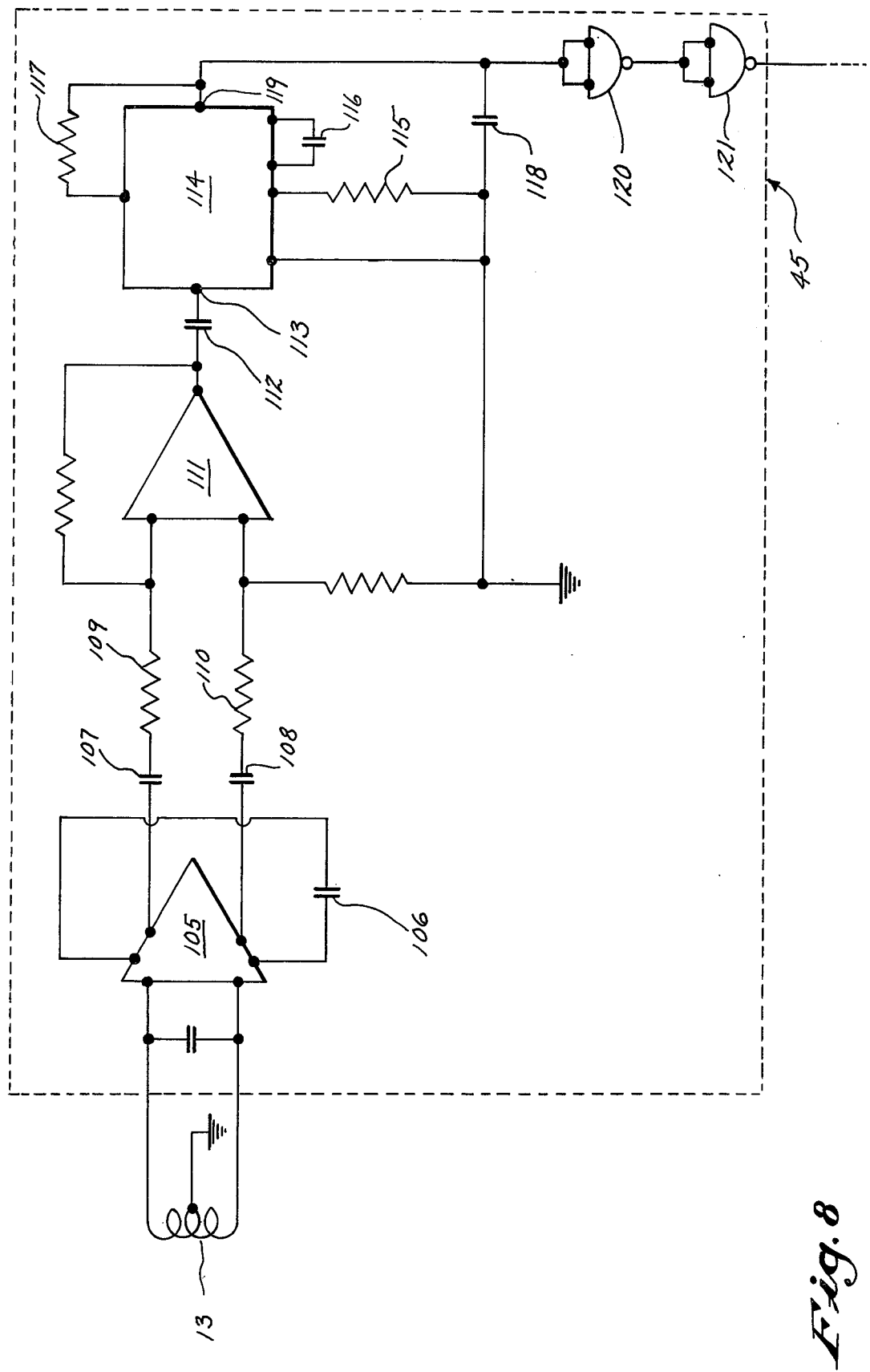
FIG. 8 is an electrical schematic diagram of an alternative embodiment of the amplifier and detector circuit which forms part of the system of FIG. 4.

An alternative embodiment of the amplifier and detector circuit 45 is illustrated in FIG. 8. The 200 kHz burst generated by the transponder 1 is received at the reset pulse receive coil 13 and is coupled through the cable 16 to a wideband video amplifier 105. The Model $\mu$A733 amplifier manufactured by Signetics is preferred. A roll-off capacitor 106 having a value of 0.0068 $\mu$F is connected to the amplifier 105 to lower its gain at 25 kHz. This attenuates any 25 kHz signal which may be crosscoupled to the coil 13. The differential output of the amplifier 105 is a-c coupled through capacitors 107 and 108 and resistors 109 and 110 to an operational amplifier 111. The amplifier is a Model $\mu$A741 which is connected in a unity gain differential input configuration. Its output is a-c coupled through a capacitor 112 to a phase comparitor input 113 on a phase-locked loop circuit 114.

The phase-locked loop circuit 114 is a Motorola McMos integrated circuit Model MC 14046 which is described in "Semi-Conductor Data Library" published in 1975 by Motorola Semi-Conductor Products, Inc. Resistor 115 and capacitor 116 are selected to provide a free running voltage controlled oscillator frequency of 100 kHz and the resistor 117 and capacitor 118 act as a low pass filter which controls the loop response time. The output terminal 119 on the phase-locked loop 114 is held below 0.5 volts when the signal applied to its input 113 has a frequency less than 100 kHz and is driven to a voltage of at least 4.5 volts when the input signal is above 100 kHz. In other words, the 200 kHz reset pulse is converted to a voltage pulse of approximately 4.5 volts. A pair of NAND gates 120 and 121 act as Schmitt triggers to buffer this voltage pulse before it is applied to the monostable multivibrator 63.

The leading edge of the reset voltage pulse applied to the input 62 of the first monostable multivibrator 63 generates a negative voltage pulse of 1 microsecond duration at its $\overline{Q}$ out terminal 64. This pulse is coupled to the latch enable terminal 39 on the three digit BCD counter 29 to read out the count then stored in the counter 29 to the decoder 41 and the display 43. Simultaneously, a positive voltage pulse of one microsecond duration is generated at a Q output terminal 65 on the monostable miltivibrator 63. This pulse is applied to an input 66 on a second monostable multivibrator 67 which is responsive to the trailing, or negative going, edge of the pulse to generate a positive pulse of one microsecond duration at a Q output terminal 68. The Q output 68 connects to the master reset terminal 40 on the three-digit BCD counter 29 and the pulse which it generates serves to reset the counter 29 immediately after its count has been latched and read out to the display 43.

Although separate circuits may be employed for the monostable multivibrators 63 and 67, in the preferred embodiment a single integrated circuit such as the dual retriggerable-resettable monostable multivibrator Model No. MC14528 disclosed in the above cited publication of Motorola Semi-Conductor Products, Inc. is employed.

Figure 5:
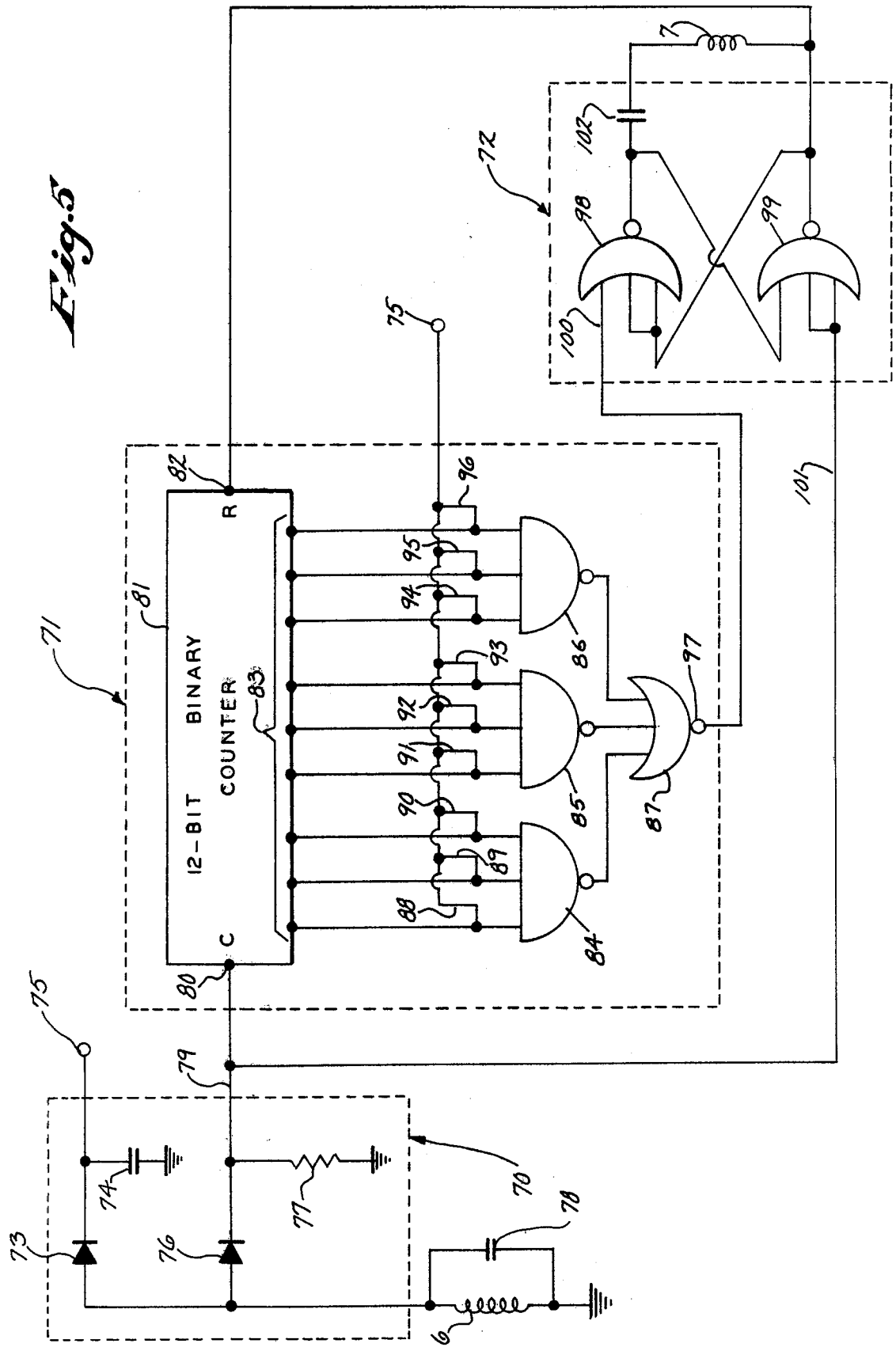
FIG. 5 is an electrical schematic diagram of the transponder unit which forms part of the present invention.

Referring to FIGS. 4 and 5, the transponder unit 1 includes three basic components: a rectifier section 70; a counter section 71; and an oscillator section 72. The rectifier section 70 includes a first diode 73 and filter capacitor 74 that connect to one lead of the count receive coil 6 and which provide a positive d-c supply voltage for the transponder unit components at a terminal 75. A second diode 76 also connects to the count receive coil 6 to rectify the signal induced thereacross and generate a positive, 25 kHz pulse train across a resistor 77. A capacitor 78 is connected in parallel with the count receive coil 6 and its value is selected to tune the resulting tank circuit to 25 kHz.

The 25 kHz pulse train generated by the rectifier section 70 is applied through a lead 79 to the clock input 80 of a 20-bit binary counter 81. A counter such as the Model MC14040 described in the above cited publication of Motorola Semi-Conductor Products, Inc. is employed in the preferred embodiment and it will count up to 4096 pulses received at its clock terminal 80. When a logic high voltage is applied to its reset terminal 82, the counter is reset to zero.

The total count in the counter 81 is indicated in binary form at a set of output terminals 83. The nine least significant digit output terminals 83 are employed in the preferred embodiment and thus a maximum count of 512 is possible. Each of the outputs 83 connects to an input on one of three NAND gates 84-86 and the output of each NAND gate 84-86 connects to respective inputs on a NOR gate 87. Each of the nine input terminals of the NAND gates 84-86 is also separately connected to the positive d-c supply terminal 75 through respective leads 88-96.

The programming, or representing, of each transponder unit 1 to a preselected identification number is accomplished by cutting the appropriate leads 88-96. For example, if the animal carrying the transponder unit 1 is to be identified by the decimal number 293, then the leads 88, 90, 93 and 96 are severed. The remaining leads 89, 91, 92, 94 and 95 remain intact and the NAND gate inputs to which they connect are held at a logic high voltage. To prevent the application of the positive supply terminal voltage to the counter output terminals 83, the connections between them and the NAND gate inputs which remain connected to the supply terminal 75 are severed. The NAND gate inputs to which the severed leads connect, on the other hand, remain connected to and controlled by the 12-bit binary counter 81. Thus, only when the counter 81 has counted 293 pulses (i.e. generates the binary number 100100101 at its outputs 83) will all inputs of the NAND gates 84-86 be at a logic high voltage. Consequently, when the counter 81 reaches its preselected identification number, all inputs to the NOR gate 87 are driven to a logic high voltage and output 97 is driven high. The decimal numbers represented by the respective leads 88-96 are indicated in Table B, and it should be apparent that any number from zero to 511 can be preselected by cutting the leads which provide the desired sum and that higher numbers are possible by including additional stages of the counter 81.

TABLE B

| Lead No. | Decimal No. |
| --- | --- |
| 88 | 1 |
| 89 | 2 |
| 90 | 4 |
| 91 | 8 |
| 92 | 16 |
| 93 | 32 |
| 94 | 64 |
| 95 | 128 |
| 96 | 256 |

The NAND gates 84-86 in the preferred embodiment of the invention are contained in a single integrated circuit such as the Model MC14023 disclosed in the above cited publication of Motorola Semi-Conductor Products, Inc. and the NOR gate 87 is contained in a single integrated circuit such as the Model MC14025 disclosed in the above cited publication of Motorola Semi-Conductor Products, Inc. along with two other NOR gates 98 and 99.

The NOR gates 98 and 99 are connected to form a flip-flop circuit which is set by a logic high voltage coupled through a lead 100 from the output terminal 97 and which is reset by the next 25 kHz pulse received through a lead 101 from the rectifier section 70. The output of the NOR gate 98 connects through a series resonant circuit formed by a capacitor 102 and the reset pulse transmitter coil 7. The output terminal of the NOR gate 99 connects to the other end of this series resonant circuit and to the reset terminal 82 on the 12-bit binary counter 81. The value of the capacitor 102 is selected to resonate, or "ring," at a frequency of 200 kHz. As a result, each time the preselected identification number is reached by the counter 81, flip-flop formed by the NOR gates 98 and 99 is set and then approximately twenty microseconds later it is reset. With each of these changes of state the series resonant circuit rings at a frequency of 200 kHz.

The short 200 kHz burst generated each time the counter 81 reaches the preselected count forms a reset pulse which is coupled to the reset pulse receive coil 13 by the magnetic field generated by the coil 7. This reset pulse is processed by the transceiver unit as described above the read out the total count then stored in its three-digit BCD counter 29. Because both counters 29 and 81 are driven in synchronism by the same 25 kHz pulse train, the total count read out of the transceiver counter 29 corresponds to the preselected count, or identification number of the transponder unit 1.

It should be apparent to those skilled in the art that numerous variations can be made to the above described system without departing from the spirit of the present invention. For example, the size of the counters 29 and 81 can be readily altered to allow the use of more or less transponder units 1, and hence allow the identification of more or less animals. Different combinations of logic gates can also be employed to provide the same overall function. Furthermore, other means for selecting the identifying number of the transponder unit 1 can be employed such as a "DIP" switch. In the preferred embodiment the leads 88-96 are formed on the printed circuit board 5 in the transponder unit 1 and these are selectively cut by the user before attaching the transponder unit to the animal. In addition, a presettable counter which is preset to the selected number and counted down to zero by the 25 kHz pulse train may be employed in lieu of the 12-bit binary counter 81 of the preferred embodiment.

Although in the preferred embodiment the pulse train generated at the transceiver unit and the reset pulse generated at the transponder unit are coupled to one another by generated electromagnetic waves, other "wireless" coupling means are possible. For example, infrared transmitters and receivers may be employed to perform this function.

The console unit 3 may also take a number of different forms. For example, rather than decoding and coupling the output of the three-digit BCD counter 29 to the visual display 43, this output may be coupled directly to the input of a computer which monitors the operation of an entire farm. In such case, it is advantageous to employ a microprocessor to communicate with the computer, in which case, the microprocessor may also perform the functions of the three-digit BCD counter 29.

And finally, although the present invention is particularly suited for identifying animals, it may also be applicable to identifying inanimate objects. The present invention is particularly suited for use in an electrically noisy and dirty environment typical of a farm, however, it is also useful in less severe environments.

I claim:

1. An animal identification system which comprises:
a pulse generator for generating a series of pulses at an output terminal;
first counter means coupled to the output of the pulse generator for counting the number of pulses, said first counter means having an output at which the total count is indicated when a signal is received at an enable terminal;
second counter means for counting the number of pulses received at its input terminal, said second counter means being operable when a preselected count is reached to generate a reset signal at its output terminal;
first coupling means including a count transmitter coil and a count receive coil for coupling the output of the pulse generator to the input terminal of the second counter means; and
second coupling means including a reset pulse transmitter coil and a reset pulse receive coil for coupling the second counter means reset signal to the enable terminal on the first counter means.

2. The animal identification system as recited in claim 1 in which said first counter means includes a reset terminal and said second coupling means includes means for coupling the second counter means reset signal to said first counter means reset terminal to reset said first counter means to a zero count.

3. The animal identification system as recited in claim 2 in which said second counter means includes means responsive to the reset signal which it generates resetting the second counter means to a zero count.

4. The animal identification system as recited in claim 1 in which the second counter means, count receive coil and reset pulse transmitter coil are contained within a transponder unit which is attached to an animal, and the transponder unit includes rectifier means coupled to said count receive coil for converting the signal received thereat to a supply voltage for the transponder elements.

5. The animal identification system as recited in claim 4 in which there are a plurality of transponder units, each attached to an animal and the second counter means in each is set to a different preselected count.

6. The animal identification system as recited in claim 1 in which display means is coupled to the first counter means output for providing a visual indication of the indicated count.

7. A system for identifying mobile objects, the combination comprising:
   a transceiver unit which includes:
   (a) means for generating a series of pulses;
   (b) means connected to said pulse generating means for counting the number of generated pulses and generating said count at an output when a reset pulse is received at an input terminal;
   (c) means connected to said pulse generating means for converting said series of pulses into a count signal suitable for wireless transmission;
   (d) means connected to said converting means for transmitting said count signal;
   (e) means for wireless reception of a reset signal; and
   (f) means connected to said wireless reception means for converting said reset signal into a reset pulse and for coupling said reset pulse to the input of said counting means; and
   a plurality of transponder units each associated with one of said mobile objects and each including:
   (a) means for wireless reception of the count signal generated by said transceiver unit;
   (b) means connected to said last named means for converting said received count signal into a series of pulses;
   (c) counter means connected to said last named means to count the number of pulses in said series, said counter means being set to generate a reset pulse when a preselected count is reached;
   (d) means connected to said last named means for converting the reset pulse into a reset signal which is suitable for wireless transmission; and
   (e) means connected to said last named means for transmitting said reset signal.

8. The identification system as recited in claim 7 which includes means coupled to said transceiver unit counter means output for visually indicating the generated count.

9. The identification system as recited in claim 7 in which said wireless reception means and said transmitting means in said transceiver unit and in said transponder units are coils of wire.

10. The identification system as recited in claim 7 in which each of said transponder units includes means coupled to said wireless reception means therein for converting said received count signal into a supply voltage for the elements of the transponder unit.

11. An identification system which comprises:
    an oscillator for generating a pulse train at an output terminal;
    first counter means connected to the oscillator output terminal for counting the number of pulses generated thereat, said first counter having an output at which the total count is indicated when a signal is received at an enable terminal;
    means including a first transmitter coil connected to the oscillator output terminal for establishing an electromagnetic field at said oscillator frequency;
    second counter means for counting the number of pulses received at its input terminal, said second counter being operable when a preselected count is reached to generate a reset signal at its output terminal;
    means connected to said second counter means input terminal including a first receive coil for converting the electromagnetic field established by said first transmitter coil to a pulse train of the same frequency; and
    second coupling means including a reset pulse transmitter coil and a reset pulse receive coil for coupling the second counter means reset signal to the enable terminal on the first counter means.

12. An identification system which comprises:
    a pulse generator for generating a series of pulses at an output terminal;
    first counter means coupled to the output of the pulse generator for counting the number of pulses, said first counter means having an output at which the total count is indicated when a signal is received at an enable terminal;
    second counter means for counting the number of pulses received at its input terminal, said second counter means being operable when a preselected count is reached to generate a reset signal at its output terminal;
    first coupling means including a count transmitter coil and a count receive coil for coupling the output of the pulse generator to the input terminal of the second counter means; and
    second coupling means including
    (a) a flip-flop having one input connected to receive the second counter means reset signal and generate a voltage change at an output terminal in response thereto;
    (b) a tuned circuit including a reset pulse transmitter coil connected to the flip-flop output terminal, said tuned circuit being operable to establish a burst of electromagnetic energy when said voltage change occurs; and
    (c) means including a reset pulse receive coil for converting said burst of electromagnetic energy to a signal which is applied to said first counter means enable terminal.